United States Patent [19]

Doane et al.

[11] Patent Number: 4,561,093
[45] Date of Patent: Dec. 24, 1985

[54] SERVICING A SOFTWARE-CONTROLLED ELEVATOR

[75] Inventors: John C. Doane; David L. Hardenbrook, both of Glastonbury, Conn.

[73] Assignee: Otis Elevator Company, Farmington, Conn.

[21] Appl. No.: 468,438

[22] Filed: Feb. 22, 1983

[51] Int. Cl.[4] .................... G06F 11/00; G01R 31/00
[52] U.S. Cl. .................... 371/20; 324/73 R
[58] Field of Search .................... 371/20, 15; 364/580; 324/73 R, 73 AT, 73 PC, 158 F

[56] References Cited

U.S. PATENT DOCUMENTS

| | | | |
|---|---|---|---|
| 4,002,973 | 1/1977 | Wiesendanger | 324/73 R |
| 4,055,801 | 10/1977 | Pike et al. | 324/73 R |
| 4,108,358 | 8/1978 | Niemaszyk et al. | 371/20 |
| 4,168,796 | 9/1979 | Fulks et al. | 371/20 |
| 4,308,615 | 12/1981 | Koegel et al. | 371/20 |
| 4,348,636 | 9/1982 | Doundoulakis | 324/73 R |
| 4,393,498 | 7/1983 | Jackson et al. | 371/20 |

Primary Examiner—Jerry Smith
Assistant Examiner—Mark Ungerman
Attorney, Agent, or Firm—Robert E. Greenstien

[57] ABSTRACT

A computer-controlled system, such as an elevator, is tested by augmenting computer operation with a diagnostic device containing a computer and coded diagnostic programs that a service technician identifies through a keyboard using diagnostic test codes that appear on an overlay which contains special codes and identifiers associated with numerical displays and lights on the diagnostic device for correlating test results to the test performed according to the program.

5 Claims, 4 Drawing Figures

SERVICING A SOFTWARE-CONTROLLED ELEVATOR

DESCRIPTION

1. Technical Field

This invention concerns computer-controlled systems, such as a computer-controlled elevator, and is particularly concerned with diagnostically testing and adjusting a computer-controlled system.

2. Background Art

The growth of microcomputer-controlled systems creates novel service problems, and elevators provide a good example.

In older elevators, discrete hardware, mainly large relay banks, perform elevator control logic functions. In newer elevators, hybrid logic circuits and relays perform many of these relay-accomplished logic functions, and in state-of-the-art elevators almost all control is performed by a microprocessor—perhaps even several microprocessors—with sophisticated software routines for performing a broad variety of elevator operations, many not realistically possible in earlier systems.

Older relay systems are manually tested, often simply by changing circuit connections with jumpers and patch cords—to actuate certain relays—to alter elevator operation for an operational test. This procedure does not call for sophisticated service tools and is quite simple.

Even in hybrid systems—those in which relays and discrete electrical circuitry are used—manual testing—circuit alteration—is commonly used to test the system. True, discrete circuit logic makes it easier and less costly to build the system, but testing the various operations of these components in operating the system is no easier.

Microprocessor-based, or put another way, "software-based" systems are becoming increasingly more popular, especially in high-rise buildings. They are extremely compact, and inexpensive to construct compared to older systems. But, they cannot be manually tested very effectively. One reason is that the circuitry is small—often integrated—and contained on close stacks of printed circuit boards. But, the main reason is because all of the system operational control is "ephemeral"—in software. So, it may be said that these genre of elevators cannot be tested in the conventional sense. They need to be diagnosed. That is, software operations have to be checked in the field by observing actual and hypothetical system operation, a potentially complex procedure, depending of course on software complexity.

In some instances logic analyzers are used to diagnose the operating microprocessor in a computer system. But, they are not really very suitable for testing the microsystem—the system around the processor. The microprocessor in a micro application not only processes information, but receives information from various parts of the system, some remote, such as transducers, position indicators, load-weighing device, motor controls, and control buttons, and uses that information to transmit new control information to other devices to control the operation of the elevator in the particular fashion of software methodology, and these operations—processing sequences—must be diagnosed to service the system thoroughly. For example, in diagnosing an elevator the elevator car may need to be moved under different conditions if software performance is observed. This process invariably requires temporarily altering a basic processor operation with overriding commands that put the car into a motion pattern in which certain information flows and processes are performed under processor control. Information used by the microprocessor in controlling the elevator according to the software routine offers primary diagnostic value here, by providing a "view", as it were, of system health. In performing a diagnostic sequence, operation of the microprocessor has to be augmented and controlled externally; information flow has to be monitored, and special commands have to be given on the processor communication link and received. In short, information has to be analyzed and displayed and faults identified.

DISCLOSURE OF INVENTION

According to the invention, a computer-controlled system, such as a microprocessor-based elevator, is tested diagnostically with another microprocessor-based test device independently programmed to perform various special manually selectable test sequences by overriding elevator microprocessor control. Through a keyboard an operator can enter coded test requests and test parameters which are converted by a diagnostic microprocessor into instructions that are conveyed to the elevator microprocessor to initiate a test system operation. Resultant elevator operation is sensed by the testing device using stored test programs and results and displayed on numeric displays and lights on the diagnostic device by addressing coded information on a keyboard or by following sequentially programmed test sequences.

A test is set forth step-by-step on a display overlay that is keyed to the displays (numerics and lights). Following instructions on the overlay, an operator enters instructions on the keyboard and receives visual information from the system that is displayed. The overlay has codes correlating the instructions and results, for indicating faults and results. The operator may select from many tests by selecting and positioning an overlay on the keyboard, then instructions identifying the tests and parameters. Each overlay keys the displays to the test for visually indicating the results, e.g. favorable. A light, numbered or coded by the overlay, may correspond to a device, e.g. button in the system and illuminated during the test to indicate its condition.

The elevator can be externally controlled by the diagnostic processor to program a memory storage device for installation in the elevator. By entering instructions on the diagnostic device that cause the car to move from one floor to the other, floor positions from a car position transducer may be stored in the memory device, for example, and the memory device may then be installed in the system as a permanent floor register tailored to the actual structure.

BEST MODE FOR CARRYING OUT THE INVENTION

Figure 1:
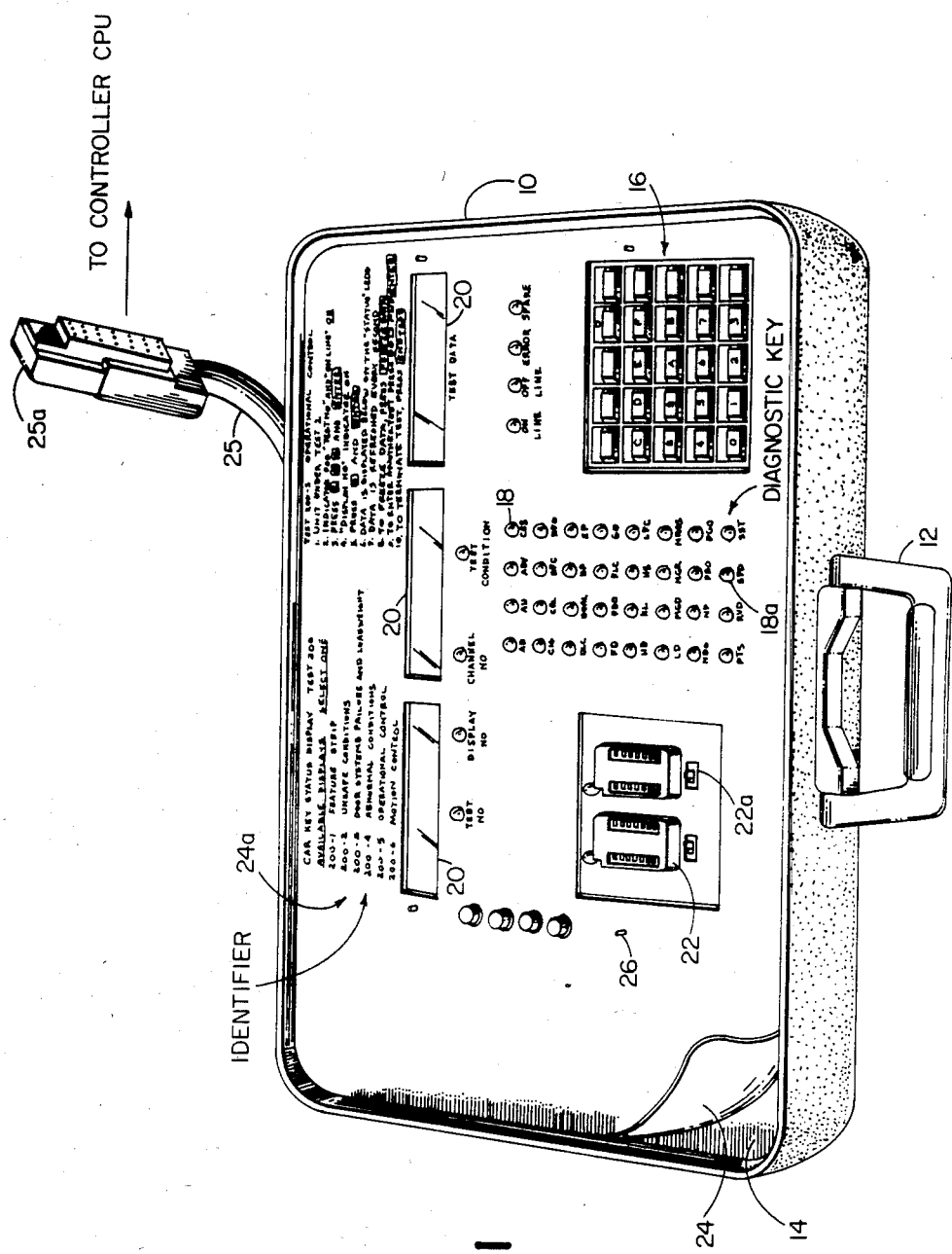
FIG. 1 is a perspective view of a diagnostic device according to the present invention showing the diagnostic device with one keyed diagnostic overlay in place on a faceplate that contains two numeric displays, a keyboard and a plurality of light-emitting diodes in rows and columns that are keyed to the overlay.

FIG. 1 shows an elevator diagnostic tool which, according to the present invention, is housed in a generally rectangular (suitcase-like) container 10, with a handle 12 and a removable lid (not shown). A keyboard 14 extends through a faceplate 16, as do a plurality of lights (e.g. light-emitting diodes) 18, three numeric displays (e.g. seven segment) 20, integrated circuit (i.e. DIP) sockets 22, and socket control switches 22a.

A test—diagnostic sequence—overlay 24 rests on the faceplate and contains cutouts for the keyboard lights, numerical displays, and the sockets. Four alignment pins 26 that are attached to the faceplate 14 extend through the overlay 24.

The overlay 24 is flexible—preferably made of a light plastic material, and written instructions pertaining to a specific diagnostic test to be performed are printed on its upper portion. The instructions specify numbered (i.e. coded) sequences; these are entered on the keyboard 16 by the operator to initiate a diagnostic test. An overlay may be used for several related tests. The sequences are stored instructions in the diagnostic tool, which implements the tests selected on the keyboard by communicating these instructions to the system CPU—for example, the elevator controller CPU in U.S. Pat. No. 4,363,381—by a cable 25 and multiplug 25a. Details on this follow. But for the moment, it only need be appreciated that according to the invention a code is entered on the keyboard according to the overlay, resulting in communication to the controller CPU—the diagnosed system—which then operates in a specific way to implement the test, and the results are indicated on the lights and numerical displays, depending on the test sequence. (For some sequences, for example, only the lights may operate.)

The overlay 24 correlates the results. It contains printed numbers—"identifiers"—that correlate each light 18 to the specific test results from the diagnostic procedure carried out in the test. For example, one LED 18a is identified on the overlay 24 by "SPD", perhaps for indicating an overspeed condition. The correlation is arbitrary, of course, depending on the selected test. The concept is to key the test results to the lights. A separate correlation sheet may be used for this, or the correlation may appear on the overlay.

During a test, results can be provided on the numeric displays 20, such as actual test results, e.g. car speed, car position, stopping time, or floor position, to name a few. Through the device in FIG. 1, this essential characteristic of the invention is revealed. Through the use of an overlay, a diagnostic test instruction or code can be entered on the keyboard to carry out a stored—programmed test; otherwise, generic or undedicated displays (lights and numerical displays) are dedicated to the test on the overlay, and test results are correlated. A service technician can carry around a file of overlays to carry out many different tests of the system automatically—without mechanically altering the system—simply by selecting an overlay, putting it in place on the faceplate, and following the instruction on it.

Figure 2:
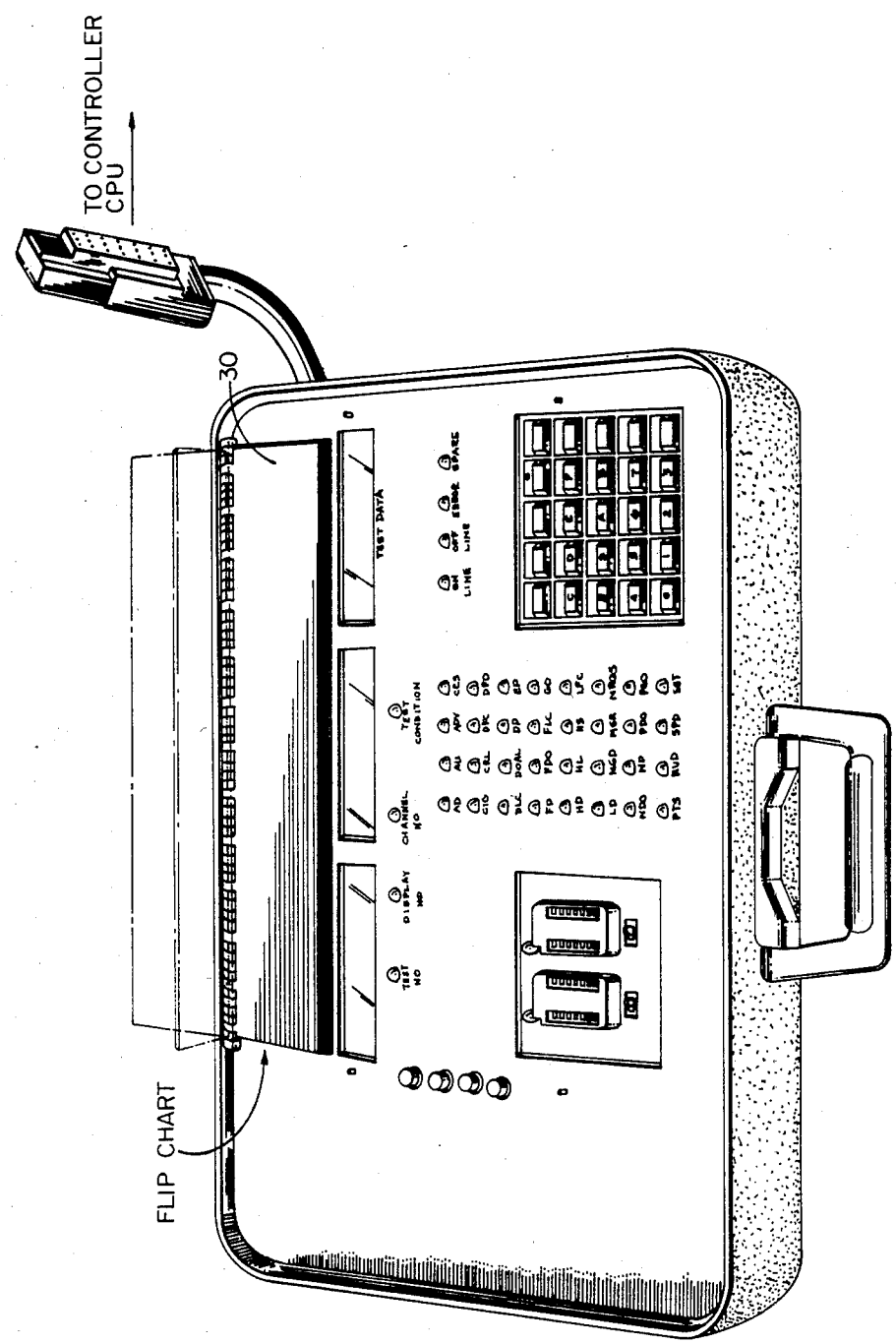
FIG. 2 is a perspective view of the diagnostic device showing a different overlay, one that contains various pages of instructions.

FIG. 2 shows the same test device, but somewhat different—in the overlay. This overlay also has identifiers that are associated with the various lights on the display and, as before, to indicate results of tests in the system associated with the specific test performed according to the instructions on the overlay. But it also contains a "flip chart" (spiral-like binder), and each page there contains instructions for a particular test or subtest—although instructions are not shown. The essential characteristic of the overlay is as before: the overlay 24 is associated with a specific test or diagnostic sequences that can be performed and correlated according to instructions and codes contained on the overlay.

Figure 3:
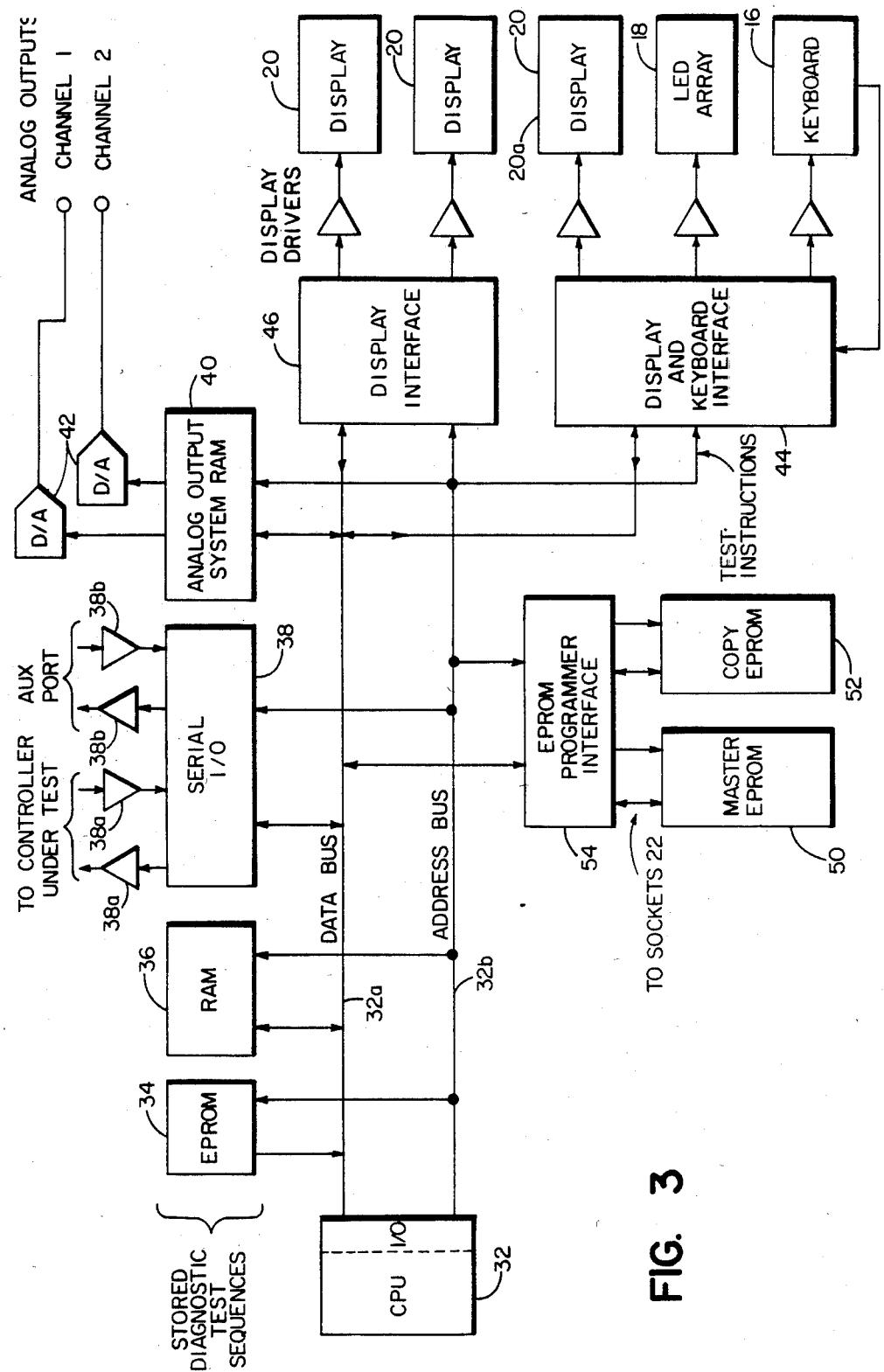
FIG. 3 is a functional block diagram of the diagnostic device.

FIG. 3 shows basic circuit components in the test device, and these are contained in the container 10, of course. The device has its own CPU or microprocessor 32 and an erasable memory (EPROM) 34 that contains the instructions for the operation of the CPU to implement tests that are selected on the keyboard. Following conventional teaching, a RAM 36 is provided for storing data during CPU operation, and the CPU 32 and the elevator controller communicate by a serial IO port 38, which is connected to a data bus 32a. The serial IO receives and transmits serial information over duplex lines (the cable and plug) to the tested controller. An analog output system RAM 40 is connected to the data bus and provides a digital signal which is converted by a D-A converter 42 to an analog output signal. Two D-A converters 42 are shown—to provide two analog outputs on channels 1 and 2. These analog output signals may control a meter or chart recorder. The address bus is connected to the keyboard 16 by a display and keyboard interface 44. Instructions or codes entered on the keyboard 16 are converted by the interface 44 into digital instructions that are then applied to the address bus, and, in response, the CPU addresses the EPROM 34 to begin test sequences.

Digital information on the data bus and address bus 32A and 32B is applied to a display interface 46, and it converts the information into BCD signals. These are then applied through buffer amplifiers to two decimal displays 20, on which the information is displayed. The third is connected to the keyboard interface 44. It provides a visual indication—verification of the instructions entered on the keyboard 16.

With the sockets 22, a master EPROM 50 and a copy EPROM 52 can be attached to the elevator system. They are connected to the CPU over the data bus and address bus through an EPROM interface 54. The CPU, upon receiving a "dubbing" instruction code on the keyboard, loads the contents of the master EPROM 50 sequentially into the copy EPROM 52, creating a copy of the master EPROM. The copy may be removed and installed in the system or saved. "Dubbing" an EPROM is thus a simple process, and a floor position memory may be copied this way.

Figure 4:
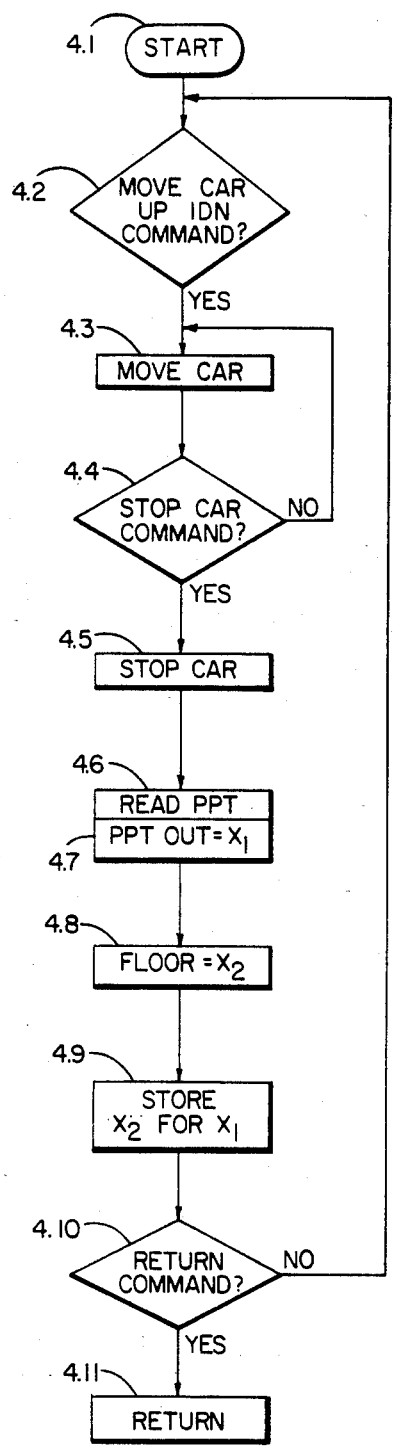
FIG. 4 is a simple flow chart of a floor memory programming sequence performable with the diagnostic tool.

A new EPROM may be made. Instructions can be entered on the keyboard 16 and applied to the CPU to cause information that is on the data bus from the controller under test to be stored in a copy EPROM. FIG. 4 shows a sequence for creating a floor memory, one application for which is shown in U.S. Pat. No. 4,256,203. Following an initial start sequence at 4, an instruction may be given at 4.2 on the keyboard 16 to cause the controller under test to move the car between various floors (UP/DN), and, when each car is stopped, to read the position on the primary-position transducer. The position information from this transducer is received at 4.6 from the controller under test and coded at 4.7. The floor is coded at 4.8, and through the EPROM programmer the position is stored for the floor at 4.9 under a floor address. The process would continue until each floor's actual position is stored until a return command is entered, to leave the programming sequence. The copy EPROM from this process would thus contain stored information indicating the actual floor location in the structure, and this EPROM may then be installed in the actual elevator system as a permanent floor address for controlling elevator stopping operations, as in U.S. Pat. No. 4,256,203. Later adjustment may be made using the programming feature. This can be very useful because the actual floor locations may change following the construction of a building. One reason is that the building dimensions can change.

Other objects and benefits of the claimed invention, as well as variations and modifications, will be obvious to one skilled in the art from the description.

We claim:

1. For diagnostically testing a system controller by a computer, a diagnostic device connectable to the system computer is characterized by a diagnostic computer for providing stored, sequenced diagnostic test instructions to the system computer in response to a coded diagnostic test signal, identifying a particular diagnostic test to be performed, for receiving system operating information from the system computer for processing the information in a predetermined manner of the stored diagnostic test and for providing information signals indicating the results of the sequenced test;

a code entry keyboard means for providing the coded diagnostic test signal;

display means including at least one numerical display and a plurality of lights, for providing visual indications of test results in response to display signals provided in response to the information signals provided by the diagnostic computer;

display device means for converting the information signal into drive signals that operate the displays;

a diagnostic test sequence overlay comprising a removable sheet which fits around the keyboard and the displays and contains a cutout for the keyboard and each numerical display and each light, coded test instructions that can be entered into the keyboard for performing a diagnostic test, coded identifiers for each numerical display and each light to correlate a diagnostic test result indicated on the diagnostic test carried out by a code entered on the keyboard.

2. The invention of claim 1, characterized by means electrically connected to the diagnostic computer for receiving an erasable, programmable read-only memory device and another such device and for use in copying the contents of the first into the second in response under the control of the diagnostic computer according to a stored program in response to a coded instruction entered on the keyboard identifying the stored program.

3. The invention of claim 1, characterized in that said overlay contains instructions on a plurality of flip-chart pages.

4. The invention according to claim 1, characterized in that the diagnostic device is contained in a rectangular, suitcase-like container having a carrying handle and a removable cover.

5. A method for testing a computer-controlled system characterized by:
(a) connecting a test-preprogrammed, diagnostic test tool to the computer;
(b) placing a test overlay on the test tool;
(c) entering instructions on a keyboard on the test tool according to instructions on the overlay; and
(d) observing data on displays on the test tool.

* * * * *